(12) United States Patent
Lan et al.

(10) Patent No.: US 9,568,096 B2
(45) Date of Patent: Feb. 14, 2017

(54) GEAR POSITION LOCKING MECHANISM OF VEHICLE

(71) Applicant: KWANG YANG MOTOR CO., LTD, Kaohsiung (TW)

(72) Inventors: Tzu-Jung Lan, Kaohsiung (TW); Chien-Ping Tseng, Kaohsiung (TW)

(73) Assignee: KWANG YANG MOTOR CO., LTD, Kaohsiung (TW)

( * ) Notice: Subject to any disclaimer, the term of this patent is extended or adjusted under 35 U.S.C. 154(b) by 9 days.

(21) Appl. No.: 14/842,017

(22) Filed: Sep. 1, 2015

(65) Prior Publication Data
US 2016/0069454 A1  Mar. 10, 2016

(30) Foreign Application Priority Data
Sep. 9, 2014 (TW) .............................. 103131022 A

(51) Int. Cl.
*B60K 20/00* (2006.01)
*F16H 61/22* (2006.01)
*F16H 59/10* (2006.01)

(52) U.S. Cl.
CPC .............. *F16H 61/22* (2013.01); *F16H 59/10* (2013.01)

(58) Field of Classification Search
CPC .. F16H 61/22; F16H 63/3491; F16H 59/0204; F16H 2061/241

USPC ................. 74/473.23, 473.15, 473.27, 473.12, 74/473.21
See application file for complete search history.

(56) References Cited

U.S. PATENT DOCUMENTS

| 7,334,497 | B2 * | 2/2008 | Giefer | ..................... F16H 59/10 74/473.12 |
| 8,327,732 | B2 * | 12/2012 | Giefer | ..................... F16H 61/22 74/473.23 |
| 2002/0170376 | A1 * | 11/2002 | Giefer | ..................... F16H 59/10 74/532 |

FOREIGN PATENT DOCUMENTS

TW    I294839    3/2008

* cited by examiner

*Primary Examiner* — William Kelleher
*Assistant Examiner* — Zakaria Elahmadi
(74) *Attorney, Agent, or Firm* — WPAT, PC; Justin King

(57) ABSTRACT

A gear position locking mechanism of a vehicle is presented. The vehicle has a gear lever unit and a gear box. The gear box is provided with a gear position sensor. The gear position locking mechanism of the vehicle includes a driving unit and a rocker arm. After receiving a target position signal sensed by the gear position sensor, the driving unit drives the rocker arm to automatically lock the gear lever unit, so that a gear lever of the gear lever unit cannot be shifted by hand. As the rocker arm is provided to prevent a gear position from being directly shifted by hand, the structural design inside the gear lever unit or the gear box does not need to be changed.

8 Claims, 5 Drawing Sheets

FIG. 4

GEAR POSITION LOCKING MECHANISM OF VEHICLE

CROSS-REFERENCE TO RELATED APPLICATION

This application claims the benefit of Taiwan Patent Application No. 103131022, filed on Sep. 9, 2014, which is hereby incorporated by reference for all purposes as if fully set forth herein.

BACKGROUND

Technical Field

The present invention relates to a gear position locking mechanism of a vehicle, and more particularly to a gear position locking mechanism in which a rocker arm capable of being controlled to swing is applied to retain a gear lever of the vehicle, thereby preventing the gear lever of the vehicle from being shifted.

Related Art

Referring to FIG. 1, Taiwan Patent No. TW 1294839 discloses a gear lever unit 10 of a vehicle. The gear lever unit 10 has a wall plate 11, the wall plate 11 is provided with multiple positioning slots 111, and a gear lever 13 and a positioning unit 14 are respectively disposed on two sides of the wall plate 11. The gear lever 13 and the positioning unit 14 are assembled on a base 15, and the base 15 is rotatably and pivotally connected to the wall plate 11, so that the gear lever 13 and the positioning unit 14 can synchronously rotate relative to the wall plate 11. The positioning unit 14 has a positioning pillar 141, the positioning pillar 141 faces a positioning slot 12 of the wall plate 11 and has a slot hole 1411 on an end surface which is spaced from the positioning slot 12 by a small distance, and a compression spring 16 and a steel ball 17 are disposed in advance in the slot hole 1411. The compression spring 16 is pressed against the steel ball 17 to make the steel ball 17 retained in the positioning slot 111, and the gear lever 13 produces a gear position retaining force of certain degree under a counter force of the compression spring 16, to prevent slip of a gear position caused by shaking of the vehicle in traveling. However, this patent fails to ensure absolute locking of a gear position when the vehicle stands still (especially on a slope) or in special circumstances.

SUMMARY

The present invention is directed to provide a gear position locking mechanism of a vehicle, which prevents shift of a gear position by using a mechanical structure.

To achieve the above objective, as for the gear position locking mechanism of the vehicle, the vehicle has a gear lever unit and a gear box, and the gear box is provided with a gear position sensor. The gear position locking mechanism of the vehicle includes a driving unit and a rocker arm. After receiving a target position signal sensed by the gear position sensor, the driving unit drives the rocker arm to automatically lock the gear lever unit, so that a gear lever of the gear lever unit cannot be shifted by hand.

In an embodiment, the gear lever unit includes multiple positioning slots and a positioning unit. A positioning member is provided on one end of the positioning unit and is limited in one of the positioning slots by a steel ball and a spring, and a linking member capable of being linked to the gear box is provided on another end of the positioning unit. The gear position locking mechanism is disposed on a fixing bracket, and the driving unit is disposed on the fixing bracket. The driving unit includes a driving module and a driving shaft, and the driving shaft moves linearly between a lower set point and an upper set point under control of the driving module. The rocker arm is pivotally disposed on the fixing bracket, and is enabled to swing freely about the fixing bracket as a pivot. A buckling portion and a joining portion are respectively provided on a head end and a tail end of the rocker arm, and the joining portion is rotatably disposed on a free end of the driving shaft. Therefore, when the driving shaft moves to the lower set point, the rocker arm swings to a first position, and the buckling portion moves away from the positioning member (the gear lever is at a target position). When the driving shaft moves to the upper set point, the rocker arm swings to a second position, and the buckling portion is buckled to the positioning member when the gear lever is at the target position, so as to limit the gear lever.

The present invention is featured in that, the driving unit and the mechanical rocker arm are provided to prevent a gear position from being directly shifted by hand. The structure of the mechanism is simple, and the structural design inside the gear lever unit or the gear box does not need to be changed, so the mechanism can be mounted in different vehicles.

The present invention is also featured in that, after locking of a gear position is completed, when the rocker arm swings to a locking position, a gear position locking sensor is triggered to generate a gear position locking signal, and a control loop receives the locking signal, to ensure locking of a target position.

BRIEF DESCRIPTION OF THE DRAWINGS

The disclosure will become more fully understood from the detailed description given herein below for illustration only, and thus are not limitative of the disclosure, and wherein:

FIG. 4 is a front view of a gear lever released by the gear position locking mechanism according to an embodiment of the present invention.

DETAILED DESCRIPTION

Figure 1:
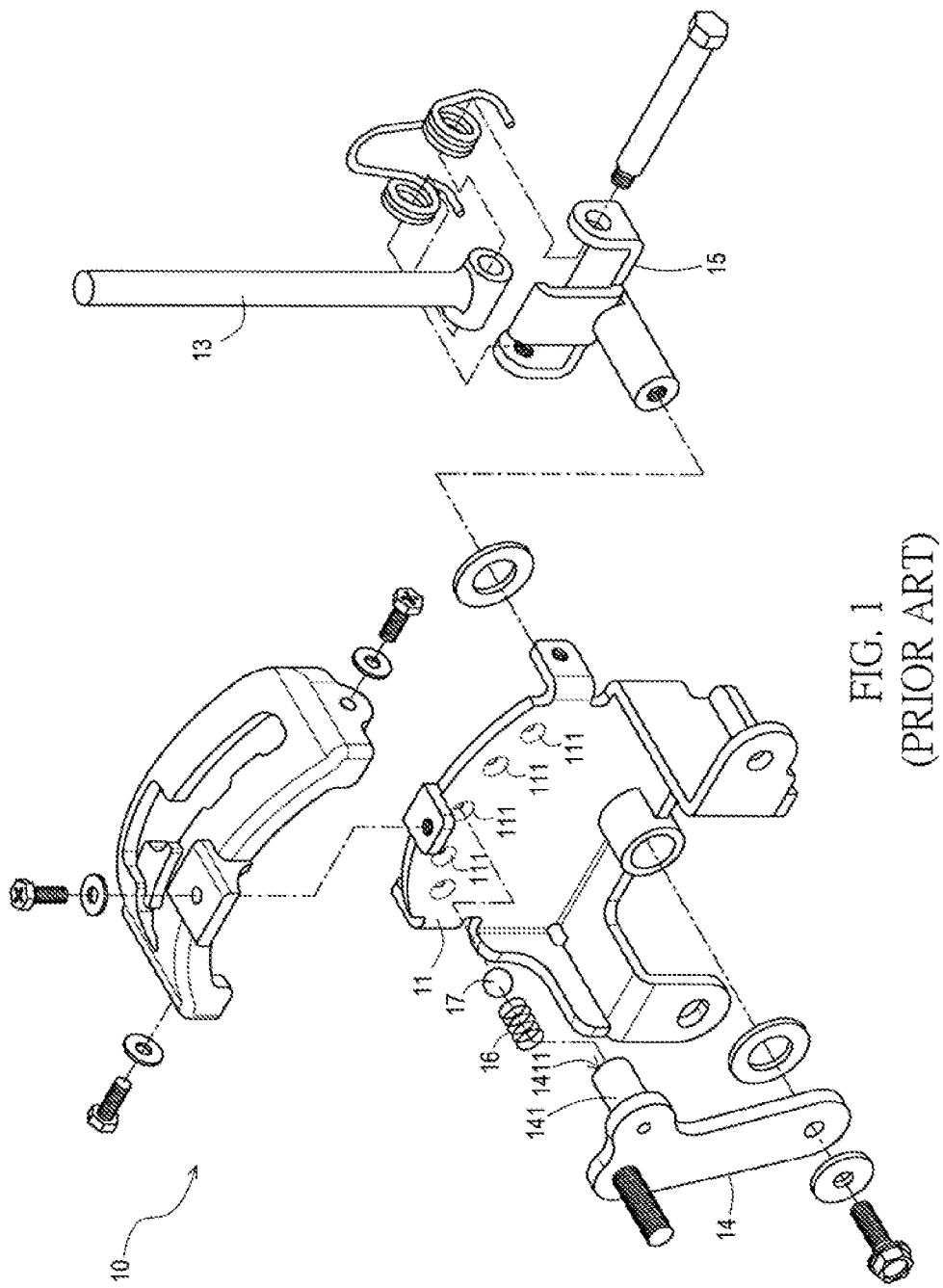
FIG. 1 is a three-dimensional view of a gear lever unit in the prior art.

Embodiments of the present invention are illustrated in detail below with reference to the accompanying drawings. The accompanying drawings are simplified, and merely illustrate the basic structure of the present invention. Therefore, elements related to the present invention are marked in the drawings, and the displayed elements are not depicted by the exact quantity, shape, proportion and the like in the implementation. The specification and proportion of the elements in actual implementation are optional, and the layout of the elements may be more complicated.

First referring to FIG. 2 to FIG. 5, a gear position locking mechanism in this embodiment is applied to a gear lever unit 10 (shown in FIG. 2) of a vehicle, and is mainly used to prevent a gear lever from being shifted by hand. The vehicle has a gear lever unit 20 and a gear box 30, and the gear box 30 is provided with a gear position sensor 31. The gear position locking mechanism 40 of the vehicle includes a driving unit 42 and a rocker arm 43. After receiving a target position signal 311 sensed by the gear position sensor 31, the driving unit 42 drives the rocker arm 43 to automatically lock the gear lever unit 20, so that a gear lever 21 of the gear lever unit 20 cannot be shifted by hand.

Specifically, the gear lever unit 20 includes the gear lever 21, multiple positioning slots 22, and a positioning unit 23. A positioning member 231 is provided on one end of the positioning unit 23 and is limited in one of the positioning slots 22 by a steel ball 2312 and a compression spring 2311, a linking member 232 is provided on another end of the positioning unit 23, and the linking member 232 is capable of being linked to the gear box 30 to shift a gear position. The gear lever 21 can rotate between different gear positions for shift, and the positioning member 231 can synchronously move with the gear lever 21 when being shifted (in other words, the gear lever 21 can be retained by locking the positioning member 231).

Figure 2:
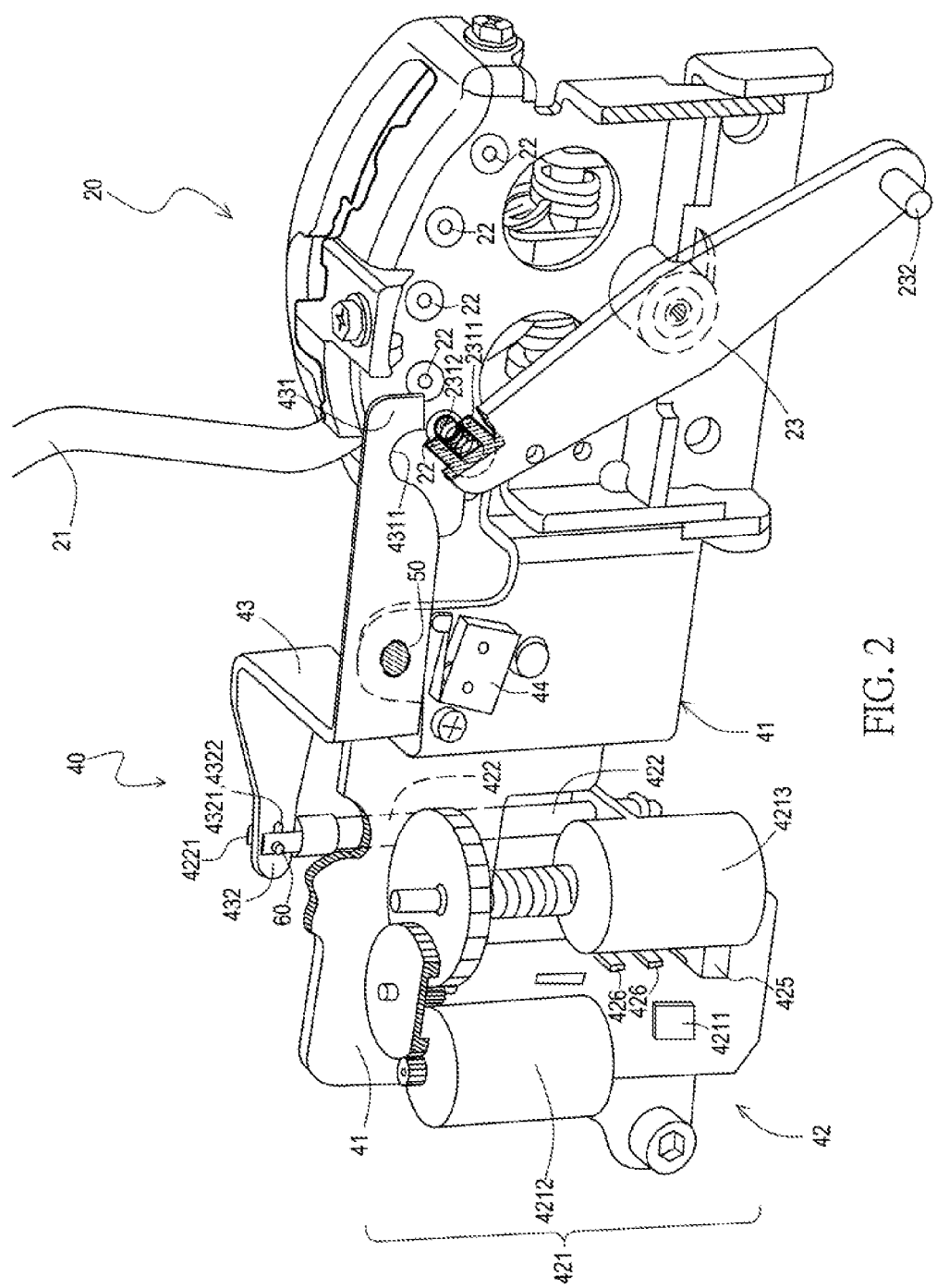
FIG. 2 is a three-dimensional view of a gear lever unit and a gear position locking mechanism applied in an embodiment of the present invention.
Figure 3:
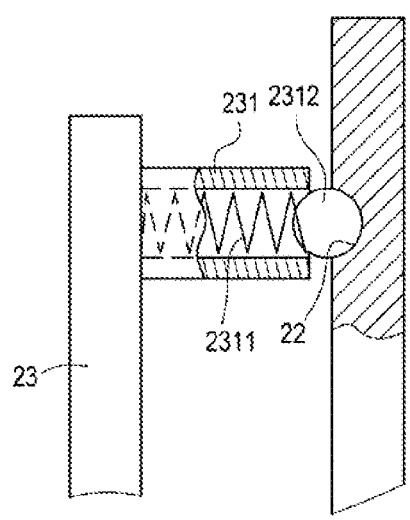
FIG. 3 is a side view of a positioning unit of the gear lever unit according to an embodiment of the present invention.

Referring to FIG. 2, in addition to the driving unit 42 and the rocker arm 43, the gear position locking mechanism 40 in this embodiment further includes a fixing bracket 41, and the driving unit 42 and the rocker arm 43 are disposed on the fixing bracket 41. The driving unit 42 includes a driving module 421 and a driving shaft 422 connected to the driving module 421. The driving shaft 422 moves reciprocally and linearly between a lower set point 423 and an upper set point 424 under linking control of the driving module 421.

Figure 4:
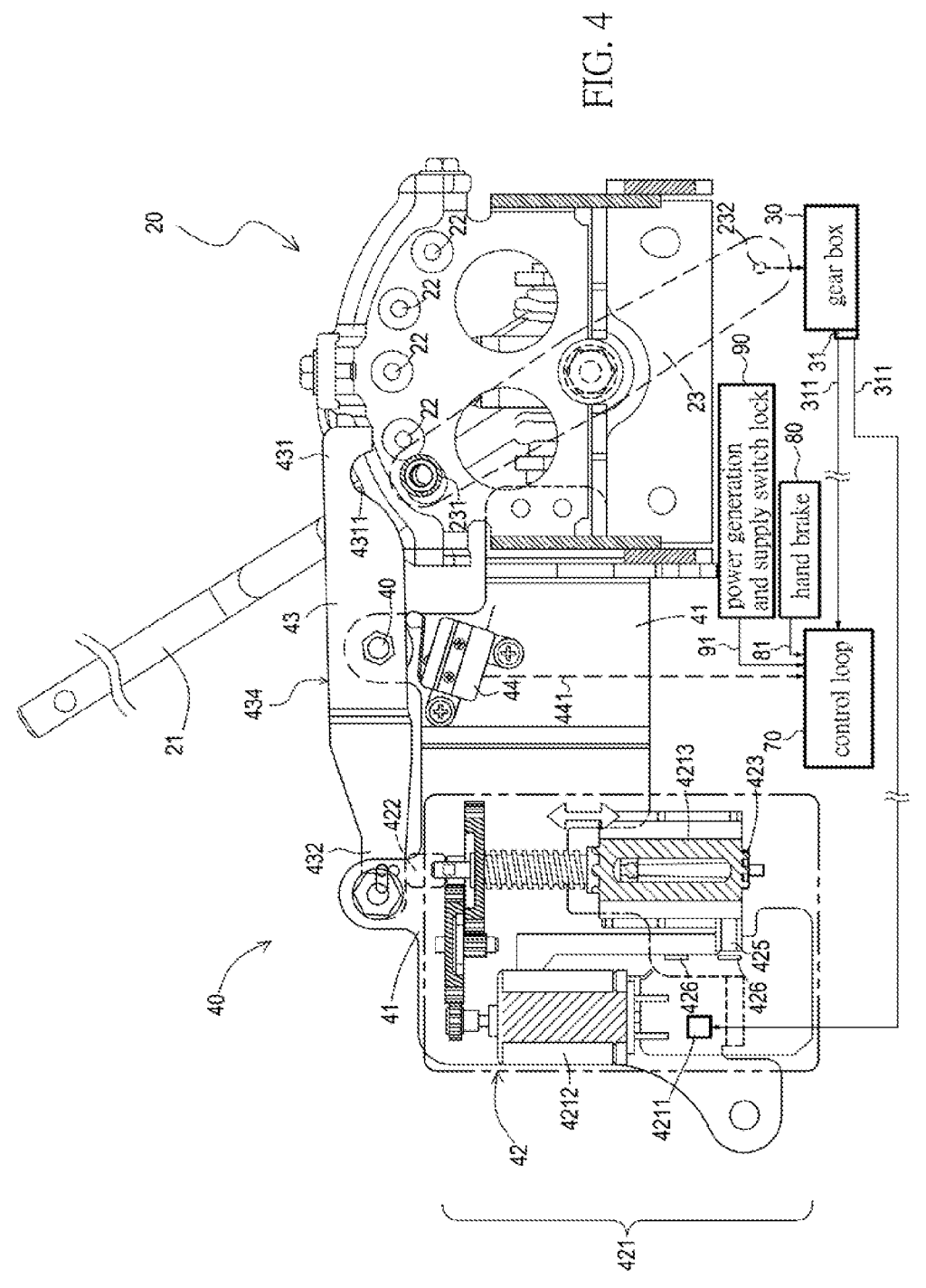

The rocker arm 43 is pivotally disposed on the fixing bracket 41, and is enabled to swing about the fixing bracket 41 as a pivot, so that a head end 431 and a tail end 432 of the rocker arm 43 can swing freely. The specific structure of the pivotally disposed rocker arm 43 can be implemented by several technical solutions, for example, the rocker arm 43 can be pivotally disposed by using an assembling member 50 such as a bolt or an assembling pin to pass through the fixing bracket 41, and the axle center of the assembling member 50 serves as the pivot. A buckling portion 4311 is provided on the head end 431 of the rocker arm 43, the tail end 432 has a joining portion 4321, and the joining portion 4321 is rotatably disposed on a free end 4221 of the driving shaft 422 (for example, by using an insert pin 60 to pass through the driving shaft 422 and an assembling hole 4322 of the joining portion 4321, so that the joining portion 4321 is assembled with the free end 4221 through the assembling hole 4322 and the insert pin 60). Therefore, when the driving shaft 422 moves to the lower set point 423, the rocker arm 43 swings to a first position 434, and the buckling portion 4311 moves away from the positioning member 231. When the gear lever 21 is at a target position and the driving shaft 422 moves to the upper set point 424, the rocker arm 43 swings to a second position 435, and the buckling portion 4311 is buckled to the positioning member 231. It should be noted that, as for the gear position locking function, in the gear position locking process, limit operation can be performed on the gear lever 21 only when it is detected that the gear lever 21 is at the target position. As shown in FIG. 4, in order to detect whether the gear lever 21 is at the target position, the gear position sensor 31 is provided on the gear box 30 which is connected to the linking member 232 of the positioning unit 23 in the gear lever unit 20. When the gear lever unit 20 is operated for shift of the gear box 30, the gear position sensor 31 detects that a current gear position is the target position, and transmits the target position signal 311 to a driving loop 4211 and a control loop 70, to facilitate determination of the target position or application of other functions of the control loop 70 during locking of a gear position. It should be further noted that, the target position may be the parking position (P) or neutral position (N). Generally, when the gear lever unit 20 has the parking position, the target position is set to be the parking position, and only the parking position needs to be locked. When the gear lever unit 20 does not have the parking position but has the neutral position, the target position is set to be the neutral position, and only the neutral position needs to be locked. To sum up, the target position to be locked is determined according to actual configuration of the gear lever unit 20.

Figure 5:
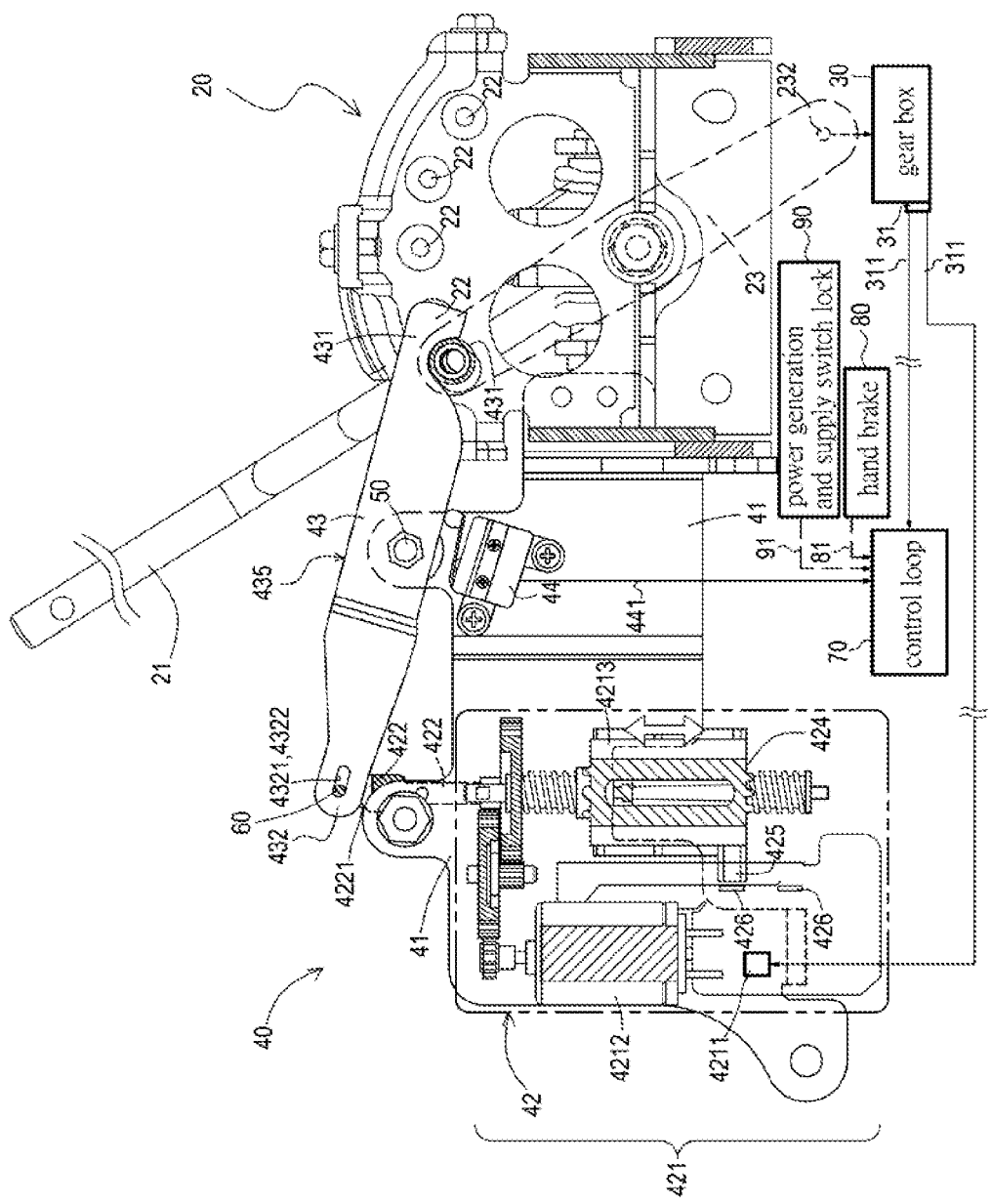
FIG. 5 is a front view of the gear lever locked by the gear position locking mechanism according to an embodiment of the present invention.

Further referring to FIG. 4 and FIG. 5, the gear position locking mechanism 40 may further include a gear position locking sensor 44 which is disposed on the fixing bracket 41 corresponding to the second position 435 of the rocker arm 43. Therefore, when the rocker arm 43 is at the second position 435 for locking, the gear position locking sensor 44 is triggered due to pressing or shielding by the rocker arm 43 to generate a gear position locking signal 441. As shown in FIG. 5, the gear position locking sensor 44 is further electrically connected to the control loop 70, and transmits the gear position locking signal 441 to the control loop 70 for use.

As shown in FIG. 4 and FIG. 5, after the rocker arm 43 is pivotally disposed on the fixing bracket 41, the free end 4221 of the driving shaft 422 and the joining portion 4321 are assembled with the driving shaft 422 through the assembling hole 4322 and the insert pin 60. In this case, the joint of the tail end 432 of the rocker arm 43 and the free end 4221 move in an arc-shaped track instead of moving linearly and reciprocally when the rocker arm 43 swings up and down. Therefore, the assembling hole 4322 of the rocker arm 43 needs to be designed as an elongated slot hole to enable the rocker arm 43 to swing up and down smoothly. In an exemplary embodiment, the elongated slot hole is an elliptical hole, and the insert pin 60 is receivable in the elliptical hole.

In an embodiment, the driving module 421 of the driving unit 42 includes a driving loop 4211, a motor 4212, and a reciprocal moving module 4213. The driving loop 4211 is electrically connected to the motor 4212 and controls the motor 4212 to rotate. The motor 4212 drives the reciprocal moving module 4213 to move reciprocally and linearly. The reciprocal moving module 4213 is connected to the driving shaft 422, and the reciprocal moving module 4213 and the driving shaft 422 are linked to perform reciprocal movement between the lower set point 423 and the upper set point 424.

To further precisely control the driving shaft 422 to drive the rocker arm 43 to swing between set points of the first position 434 and the second position 435, the driving unit 42 is provided with a detecting unit 425 on the reciprocal moving module 4213, and positioning detection devices 426 are disposed at the lower set point 423 and the upper set point 424. When the reciprocal moving module 4213 moves to the upper set point 424 or the lower set point 423, a set point stop and reset signal is generated in accordance with interaction (for example, mutual contact or mutual magnetic induction) between the detecting unit 425 and the positioning detection device 426, so that the driving unit 42 can perform precise limit control on movement of the reciprocal moving module 4213.

In an embodiment, the detecting unit 425 may be a magnetic unit, and the positioning detection device 426 may correspondingly be a Hall crystal circuit sensor.

Referring to FIG. 4 and FIG. 5, in a gear position locking state, to release locking of a gear position, a hand brake 80 in a braking state is used to further release the braking state (that is, the hand brake is pushed down) to generate a braking release signal 81, or a power generation and supply switch lock 90 of the vehicle is switched from an ON state to an OFF state to generate an OFF signal 91. The control loop 70 receives the braking release signal 81 or the OFF signal 91, sends a control signal to the driving loop 4211 of the driving unit 42, and controls, through a relay (not shown) on the driving loop 4211, the motor 4212 to rotate, so as to propel the driving shaft 422 to move downward to the lower set point 423. In this case, the rocker arm 43 swings to the first position 434, and the buckling portion 4311 sets free the positioning member 231 to release locking of the gear lever 21 (definitely, in a condition that the gear position is in a locking state). After sensing the target position, the gear position locking mechanism of the vehicle in the present invention can automatically lock the gear lever unit, so that the gear lever of the gear lever unit cannot be shifted by hand, and when the hand brake is pushed down or the power generation and supply switch lock is in an OFF state, the locking of the gear lever unit can be automatically released. The application of the present invention is described above in detail, but the present invention is not limited thereto and other implementation manners can be adopted in actual use.

The above merely describes exemplary implementation manners or embodiments of technical schemes employed by the present invention for solving the problems, but is not to limit the scope of implementation of the present invention. Equivalent variations and modifications consistent with the content of the claims of the present invention or made according to the scope of the present invention shall fall within the scope of the present invention.

What is claimed is:

1. A gear position locking mechanism of a vehicle, wherein the vehicle has a gear lever unit and a gear box, the gear box is provided with a gear position sensor, the gear position locking mechanism of the vehicle comprises a driving unit and a rocker arm, and after receiving a target position signal sensed by the gear position sensor, the driving unit drives the rocker arm to automatically lock the gear lever unit,
wherein the gear position locking mechanism comprises a fixing bracket, and the driving unit is disposed on the fixing bracket, the rocker arm is pivotally disposed on the fixing bracket for swing between a first position and a second position,
wherein the gear position locking mechanism further comprises a gear position locking sensor, and the gear position locking sensor is disposed on the fixing bracket, so that the gear position locking sensor is triggered by the rocker arm to generate a gear position locking signal when the rocker arm is at the second position,
wherein the gear position locking sensor is electrically connected to a control loop, and when the rocker arm is at the second position and locking of a gear position is completed, the gear position locking sensor outputs the gear position locking signal to the control loop, to acquire a locking state of the target position.

2. The gear position locking mechanism of the vehicle according to claim 1, wherein the gear lever unit comprises a gear lever, multiple positioning slots, and a positioning unit synchronously moving with the gear lever when being shifted; a positioning member is provided on one end of the positioning unit and is limited in one of the positioning slots by a steel ball and a compression spring, and a linking member capable of being linked to the gear box is provided on another end of the positioning unit; the driving unit comprises a driving module and a driving shaft, and the driving shaft moves linearly between a lower set point and an upper set point under control of the driving module; the rocker arm is pivotally disposed on the fixing bracket, and is enabled to swing freely about the fixing bracket as a pivot; a buckling portion and a joining portion are respectively provided on a head end and a tail end of the rocker arm; the joining portion is rotatably disposed on a free end of the driving shaft, so that when the driving shaft moves to the lower set point, the rocker arm swings to the first position, and the buckling portion moves away from the positioning member; and when the gear lever is at a target position, the driving shaft moves to the upper set point, the rocker arm swings to the second position, and the buckling portion is buckled to the positioning member when the gear lever is at the target position, so as to limit the gear lever.

3. The gear position locking mechanism of the vehicle according to claim 2, wherein the joining portion of the rocker arm has an assembling hole, the joining portion is assembled to the driving shaft through the assembling hole and an insert pin, and the assembling hole of the rocker arm is an elongated slot hole.

4. The gear position locking mechanism of the vehicle according to claim 3, wherein the elongated slot hole is an elliptical hole, and the insert pin is receivable in the elliptical hole.

5. The gear position locking mechanism of the vehicle according to claim 2, wherein the driving module of the driving unit comprises a driving loop, a motor, and a reciprocal moving module, the driving loop is electrically connected to the motor and controls rotation of the motor, the motor drives the reciprocal moving module to move reciprocally and linearly, the reciprocal moving module is connected to the driving shaft, and the reciprocal moving module and the driving shaft are linked to perform reciprocal movement between the lower set point and the upper set point.

6. The gear position locking mechanism of the vehicle according to claim 5, wherein the driving unit is provided with a detecting unit on the reciprocal moving module, positioning detection devices are disposed at the lower set point and the upper set point, and when the reciprocal moving module moves to the upper set point or the lower set point, a set point stop and reset signal is generated in accordance with interaction between the detecting unit and the positioning detection device, so that the driving unit is capable of limiting the movement of the reciprocal moving module.

7. The gear position locking mechanism of the vehicle according to claim 4, wherein the detecting unit is a magnetic unit, and the positioning detection device is a Hall crystal circuit sensor.

8. The gear position locking mechanism of the vehicle according to claim 5, wherein when the driving loop of the driving unit releases locking of a gear position, the driving loop controls, through a relay on the driving loop, the motor to rotate, so as to propel the driving shaft to move downward to the lower set point, and the rocker arm swings to the first position, so that the buckling portion sets free the positioning member to release locking of the gear lever; and when the driving unit performs locking of a gear position, the driving loop controls, through the relay, the motor to rotate, so as to propel the driving shaft to move upward to the upper set point, and the rocker arm swings to the second position, so that the buckling portion is buckled to the positioning member of the gear lever, thereby locking the position of the gear lever.

* * * * *